United States Patent [19]

Kurz

[11] Patent Number: 5,599,869
[45] Date of Patent: Feb. 4, 1997

[54] PIGMENTED PLASTICS MOLDING COMPOSITION AND ITS USE

[75] Inventor: Klaus Kurz, Hofheim, Germany

[73] Assignee: Hoechset AG, Germany

[21] Appl. No.: 298,390

[22] Filed: Aug. 30, 1994

[30] Foreign Application Priority Data

Sep. 1, 1993 [DE] Germany .................. 43 29 395.6
Dec. 27, 1993 [DE] Germany .................. 43 44 690.6

[51] Int. Cl.$^6$ ..................................................... C08K 3/00
[52] U.S. Cl. .......................... 524/495; 524/496; 524/417
[58] Field of Search ................... 524/417, 495, 524/496

[56] References Cited

U.S. PATENT DOCUMENTS

| | | | |
|---|---|---|---|
| 4,391,764 | 5/1983 | Edinger et al. | 264/25 |
| 4,477,608 | 10/1984 | Babler et al. | 523/215 |
| 5,053,440 | 10/1991 | Schueler | 523/137 |
| 5,350,792 | 9/1994 | Hess et al. | 524/417 |

FOREIGN PATENT DOCUMENTS

| | | |
|---|---|---|
| 1284125 | 5/1991 | Canada . |
| 0053256 | 10/1981 | European Pat. Off. . |
| 0101667 | 8/1983 | European Pat. Off. . |
| 0190997 | 1/1986 | European Pat. Off. . |
| 0327508 | 2/1989 | European Pat. Off. . |
| 0400305 | 4/1990 | European Pat. Off. . |
| 0522370 | 6/1992 | European Pat. Off. . |

OTHER PUBLICATIONS

European Search Report No. 94113046.0, Dec. 22, 1994.

*Primary Examiner*—Edward J. Cain
*Attorney, Agent, or Firm*—Connolly & Hutz

[57] ABSTRACT

A plastics molding composition comprises (a) at least one organic thermoplastic polymer, (b) at least one mineral black pigment and (c) another coloring agent which is an inorganic and/or organic pigment and/or a polymer-soluble dyestuff, and if appropriate (d) further additives. This molding composition is used for the production of shaped objects which are provided with colored symbols with the aid of a laser beam. In the process for the production of such a shaped article, the molding composition mentioned is employed and the resulting shaped article is exposed to a laser beam having a principal wavelength of 1,064 nm or of 532 nm.

8 Claims, No Drawings

PIGMENTED PLASTICS MOLDING COMPOSITION AND ITS USE

The invention relates to a plastic molding composition which essentially comprises at least one organic polymer, at least one carbon-containing black pigment and at least one other coloring agent, and to the use of such a plastics molding composition as a starting material for the production of shaped objects which can be provided preferably with colored symbols using a laser beam.

It is known that surfaces of plastics can be written on with laser beams, an Nd:YAG laser (wavelength: 1,064 nm) or a frequency-doubled Nd:YAG laser (wavelength: 532 nm) preferably being used. A change in color which can be adjusted in a controlled manner cannot be realized flexibly: in general, only pale script on a dark background or dark script on a pale background is possible. Thus, for example, a black/white contrast is produced with a laser beam in polyacetal to which carbon black or graphite is added as a filler, preferably in a concentration of 0.08 to 0.125%. An optical brightener which is not destroyed by the action of the laser can also be admixed to the plastic/carbon black or graphite mixture (EP-B-53 256).

Processes for writing on high molecular weight material which comprises at least one radiation-sensitive additive which causes discoloration furthermore are known, laser light having a wavelength in the near UV and/or visible and/or near IR range being used as the energy beam and at least one inorganic and/or organic pigment and/or a polymer-soluble dyestuff being used as the additive. The high molecular weight material is, in particular, a fully synthetic organic thermoplastic, i.e. a plastic which has been prepared by polymerization, polycondensation or polyaddition, for example polyolefin, polyester, polyamide, polyether and polyacetal, or also a mixture of such plastics. Examples of inorganic pigments are white pigments, metal oxides, metal sulfides as well as carbon black and graphite, the metal-containing pigments being preferred. The amount of additive is 0.001 to 10% by weight (based on the high molecular weight material). Pulsed lasers, for example solid state pulsed lasers, continuous-wave lasers modified by pulses, metal vapor lasers and semiconductor lasers are used as the radiation source (EP-A 190 997).

A process is likewise known for writing on high molecular weight organic material in the form of objects, foils and films with a laser, in which the material, which comprises at least one radiation-sensitive additive which can be bleached out and at least one less radiation-sensitive compound which does not bleach out, is exposed to a laser beam; pulsed laser light of wavelength in the near UV and/or visible range is used here, at least one azo and/or indanthrone pigment is employed as the additive which can be bleached out and at least one inorganic and/or organic pigment and/or a polymer-soluble dyestuff serves as the compound which does not bleach out. In this case, the pulsed laser light is produced, in particular, with a pulsed or pulse-modified, frequency-doubled Nd:YAG laser or a metal vapor laser or an excimer laser (EP-A 327 508).

However, colored markings on a dark substrate cannot be produced by the known processes. The object of the invention is to bypass the disadvantages of the prior art.

The invention relates to a plastics molding composition which essentially comprises (a) at least one organic thermoplastic polymer, (b) at least one mineral black pigment and (c) at least one further coloring agent which is an inorganic and/or organic pigment and/or a polymer-soluble dyestuff, and (d) the molding composition additionally comprises other additives, if appropriate.

The invention furthermore relates to the use of the plastics molding composition described above as a material for the production of shaped objects which can be provided with colored symbols using a laser beam.

The invention furthermore relates to a process for the production of a shaped article provided with colored symbols by the action of a laser beam on an object which has been produced from a plastics molding composition. In these processes, a plastics molding composition which is composed of (a) a thermoplastic polymer,
(b) a mineral black pigment,
(c) another coloring agent from the series consisting of inorganic and/or organic pigments and/or a polymer-soluble dyestuff and
(d) if appropriate further additives, is used, and the shaped article is exposed to a laser beam having a main wavelength of 1,064 nm or 532 nm.

It has been found that particularly clear colored symbols on a dark background can be achieved by using mineral black pigments.

The polymer (a) which is used according to the invention is a thermoplastic polymer, for example polyester (polyethylene terephthalate and polybutylene terephthalate), polyamide, polyvinyl chloride, polyarylate, polyarylene sulfide, such as polyphenylene sulfide, and polyaryletherketone. Polymers which are furthermore suitable are polyolefins, which optionally contain fluorine atoms, for example polyethylene, polypropylene and polytetrafluoroethylene, and polymers having amide or acetal groups in the main chain; but preferably polyacetals, i.e. oxymethylene homopolymers and oxymethylene copolymers, which preferably contain oxyethylene units as co-units, or polybutylene terephthalate. Instead of an individual polymer, a mixture of various polymers can also be used.

The pigment (b) is a mineral black pigment with elemental carbon which is known by the terms bone charcoal, bone black or ivory black. It is prepared from bone or ivory waste by a special coking process, the organic content present in the substrates decomposing and the carbon formed being embedded as pigment in a calcium phosphate matrix. The mineral black pigment in general contains 70 to 90% by weight of calcium phosphate and 10 to 30% by weight of carbon, preferably 75 to 85% by weight of calcium phosphate and 15 to 25% by weight of carbon. The content of black pigment in the plastics molding composition is 0.001 to 10% by weight, preferably 0.01 to 8% by weight, in particular 0.2 to 5% by weight.

The density of the black pigment is in the range from 2.3 to 2.8 $g/cm^3$, preferably from 2.4 to 2.6 $g/cm^3$. A black pigment having a particle diameter of 1 to 50 $\mu m$, preferably 2 to 25 $\mu m$, is particularly suitable.

The coloring agent (c) is an inorganic and/or organic pigment and/or a polymer-soluble dyestuff. Coloring agents which are to be used are those which are customary and—in respect of the other use properties of coloring agents (for example migration properties, light fastness, heat stability)—suitable for the specific plastics molding composition. These are described in the brochure "Farbmittel von Hoechst für die Kunststoffindustrie (Coloring Agents from Hoechst for the Plastics Industry)" (1993 Edition, Hoechst AG, Frankfurt am Main). Suitable coloring agents if a polyacetal molding composition is used are, for example, ultramarine blue, chromium titanate, manganese violet, copper phthalocyanine, iron oxide and quinacridone and benzimidazolone dyestuffs.

Further substances, for example fillers, such as chalk, mica, talc, feldspar, wollastonite and aluminum silicate and furthermore antioxidants, light stabilizers, flame-proofing agents, heat stabilizers, reinforcing agents, such as glass fibers, or processing auxiliaries which are customary in the processing of plastics can also be added to the molding composition, depending on the intended use.

The molding composition according to the invention can be prepared by the customary processes. Thus, for example, the black pigment component (b) and the coloring agent component (c) are admixed with the plastics material using extruders or using mixing or grinding apparatuses. The resulting mixture is then brought into the desired final form by processes which are known per se, such as compression molding, casting, calendering or extrusion or by injection molding. The test specimen is written on with the laser by being brought into the beam path of a pulsed laser, for example an Nd:YAG laser or frequency-doubled Nd:YAG laser. The plastics molding composition according to the invention can be used in those areas where previously customary printing processes have been employed for writing. Thus, for example, the process can be used for writing on or marking shaped articles of thermoplastic material in the electronics and motor vehicle industry, for example for labeling keyboards, housings and individual components. These objects can be provided with symbols without problems using a laser beam.

EXAMPLES

The examples were carried out under the following conditions:

A homogeneous mixture of (a) a thermoplastic polymer (b) a mineral black pigment and (c) a dyestuff was prepared in a commercially available extruder (ZSK 28, Werner und Pfleiderer, Stuttgart, Federal Republic of Germany).

Sheet-like test specimens (120 mm×80 mm×2 mm) were produced from the resulting molding composition by injection molding. The test specimens of Examples 1 to 9 were exposed to the radiation of an Nd:YAG laser of wavelength 1,064 mm: the pulse frequency was 15 kHz at a laser output of about 20 watt. The writing field of the Nd:YAG laser had a diameter of 150 mm at a free operating distance of 180 mm. During the radiation period, the laser beam was moved such that letters were formed on the test specimens. Colored letters on a dark background were formed, depending on the dyestuff used.

The thermoplastic polymers used were:
a) "POM"—a commercially available polyacetal co-polymer (98% by weight of oxymethylene units and 2% by weight of oxyethylene units) having a melt index $MFI_{190/2.16}$ of 9 g/10 minutes according to DIN 53735 and a crystallite melting range from 164° to 167° C.,
b) "PBT"—a commercially available polybutyleneterephthalate having a melt index $MVI_{250/2.16}$ of 25 cm$^3$/10 minutes according to DIN 53735, crystallite melting point 220°–225° C. (ASTMD 2133).

1) Composition of the Molding Composition
   99 parts by weight of POM
   1 part by weight of mineral black pigment (C.I. Pigment Black 9)
   0.2 part by weight of organic red pigment (C.I. Pigment Red 209)
Clear colored letters produced by laser irradiation:
   Red on a dark background.
2) Composition of the Molding Composition
   99 parts by weight of POM
   1 part by weight of mineral black pigment (C.I. Pigment Black 9)
   0.2 part by weight of organic yellow pigment (C.I. Pigment Yellow 180)
Clear colored letters produced by laser irradiation:
   Yellow on a dark background.
3) Composition of the Molding Composition
   99 parts by weight of POM
   1 part by weight of mineral black pigment (C.I. Pigment Black 9)
   0.2 part by weight of organic green pigment (C.I. Pigment Green 7)
Clear colored letters produced by laser irradiation:
   Green on a dark background.
4) Composition of the Molding Composition
   98 parts by weight of POM
   2 parts by weight of mineral black pigment (C.I. Pigment Black 9)
   0.4 part by weight of organic red pigment (C.I. Pigment Red 209)
Clear colored letters produced by laser irradiation:
   Red on a dark background.
5) Composition of the Molding Composition
   99 parts by weight of PBT
   1 part by weight of mineral black pigment (C.I. Pigment Black 9)
   0.2 part by weight of organic red pigment (C.I. Pigment Red 209)
Clear colored letters produced by laser irradiation:
   Red on a dark background.
6) Composition of the Molding Composition
   99 parts by weight of POM
   1 part by weight of mineral black pigment (C.I. Pigment Black 9)
   0.2 part by weight of orange-colored fluorescence dyestuff (C.I. Pigment Solvent Orange 63)
Clear colored letters produced by laser irradiation:
   Orange on a dark background.
7) Composition of the Molding Composition
   99 parts by weight of POM
   1 part by weight of mineral black pigment (C.I. Pigment Black 9)
   0.2 part by weight of violet sublimation dyestuff (C.I. Pigment Solvent Violet 13)
Clear colored letters produced by laser irradiation:
   Pale blue on a dark background.
8) Composition of the Molding Composition
   99 parts by weight of POM
   1 part by weight of mineral black pigment (C.I. Pigment Black 9)
   0.2 part by weight of organic blue pigment (C.I. Pigment Blue 15:3)
Clear colored letters produced by laser irradiation:
   Blue on a dark background.
9) Composition of the Molding Composition
   99 parts by weight of POM
   1 part by weight of mineral black pigment (C.I. Pigment Black 9)
   0.2 part by weight of organic blue pigment (C.I. Pigment Blue 15:3)
   0.2 part by weight of organic yellow pigment (C.I. Pigment Yellow 180)
Clear colored letters produced by laser irradiation:
   Mixed color on a dark background.
10) Composition of the Molding Composition as Example 1. Instead of the Nd:YAG laser of wavelength 1,064 nm, a frequency-doubled Nd:YAG laser of wavelength 532 nm (pulse frequency 5 kHz, output about 3 watt) was used. A clear red script on a dark background was formed.

I claim:

1. A process for the preparation of an article with colored laser-written symbols, which comprises the steps of:
   providing a plastic molding composition consisting essentially of at least one organic thermoplastic polymer, at least one black pigment selected from the group consisting of bone charcoal, bone black or ivory black, and a coloring agent;
   forming said molding composition into a shaped article, and
   exposing the shaped article to a laser beam,
   wherein said laser beam forms colored symbols on a dark background of the shaped article.

2. A process as claimed in claim 1, wherein said coloring agent is an organic or inorganic pigment.

3. A process as claimed in claim 1, wherein the coloring agent is a polymer-soluble dyestuff.

4. A process as claimed in claim 1, wherein the laser beam has a mean wavelength of 1,064 nm.

5. A process as claimed in claim 1, wherein the laser beam has a mean wavelength of 531 nm.

6. A process as claimed in claim 1, wherein the thermoplastic polymer is polyacetal, polyester, reinforced polypropylene, polyphenylesulfide, or a liquid crystal copolyester.

7. A process as claimed in claim 1, wherein the thermoplastic polymer is polybutylene terephthalate.

8. A process for the preparation of an article with colored laser-written symbols, which comprises the steps of:
   providing a plastic molding composition consisting essentially of at least one organic thermoplastic polymer, at least one black pigment selected from the group consisting of bone charcoal, bone black or ivory black, and at least one coloring agent;
   forming said molding composition into a shaped article, and
   exposing the shaped article to a laser beam,
   wherein said laser beam forms symbols of the same color as the at least one coloring agent on a dark background on the shaped article by removing or destroying the black pigment.

* * * * *